United States Patent
Pohl

(10) Patent No.: US 7,349,517 B2
(45) Date of Patent: Mar. 25, 2008

(54) SYSTEM FOR MEASURING BURN-OUT OF FUEL ELEMENTS OF A HIGH-TEMPERATURE REACTOR

(75) Inventor: Peter Pohl, Düren (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 10/546,086

(22) PCT Filed: Jan. 15, 2004

(86) PCT No.: PCT/DE2004/000037

§ 371 (c)(1),
(2), (4) Date: Aug. 17, 2005

(87) PCT Pub. No.: WO2004/075205

PCT Pub. Date: Sep. 2, 2004

(65) Prior Publication Data

US 2006/0215800 A1    Sep. 28, 2006

(30) Foreign Application Priority Data

Feb. 18, 2003    (DE) ............................... 103 06 648

(51) Int. Cl.
*G21C 17/00*    (2006.01)
(52) U.S. Cl. ........................ 376/257; 376/156; 376/158; 376/245; 250/370.03; 250/492.1

(58) Field of Classification Search ............ 250/370.11, 250/371, 390.01, 390.02, 370.03, 492.1; 376/245, 257, 156, 158

See application file for complete search history.

(56) References Cited

U.S. PATENT DOCUMENTS

| | | | |
|---|---|---|---|
| 3,388,254 A * | 6/1968 | Haller et al. ................. | 250/362 |
| 3,398,280 A | 8/1968 | Moulthrop | |
| 3,786,256 A | 1/1974 | Untermyer | |
| 3,796,875 A * | 3/1974 | Michaelis ............... | 250/390.04 |
| 3,796,876 A * | 3/1974 | Krinninger et al. .... | 250/363.01 |
| 3,855,058 A * | 12/1974 | Groos et al. ................. | 376/257 |
| 4,493,810 A * | 1/1985 | Lee et al. .................... | 376/254 |
| 4,510,117 A * | 4/1985 | Phillips et al. .............. | 376/257 |
| 4,515,749 A | 5/1985 | Schoenig, Jr. et al. | |
| 4,881,247 A * | 11/1989 | Smith et al. ................. | 376/257 |
| 4,902,467 A * | 2/1990 | Schoenig et al. ........... | 376/159 |
| 2006/0215800 A1* | 9/2006 | Pohl ........................... | 376/257 |

* cited by examiner

*Primary Examiner*—Ricardo J. Palabrica
(74) *Attorney, Agent, or Firm*—Andrew Wilford

(57) ABSTRACT

The burnout of a fuel element in a reactor is determined by first transferring a fuel element from a reactor to a measuring position and then subjecting the transferred fuel element at the position to a neutron flux. A first detector measures the total γ radiation emitted by the transferred fuel element and thereafter, if the radiation measured by the first detector exceeds a predetermined first limit, the transferred fuel element is returned back to the reactor. If not, a second detector measures a magnitude of high energy γ radiation above 1 MeV emitted by the transferred fuel element and thereafter only if the radiation measured by the second detector exceeds a predetermined second limit, the transferred fuel element is transferred back to the reactor. The element is not returned to the reactor if the radiation measured by the second detector is below the second limit.

19 Claims, 1 Drawing Sheet

SYSTEM FOR MEASURING BURN-OUT OF FUEL ELEMENTS OF A HIGH-TEMPERATURE REACTOR

CROSS REFERENCE TO RELATED APPLICATIONS

This application is the US national phase of PCT application PCT/DE2004/000037 filed 15 Jan. 2004 with a claim to the priority of German patent application 10306648.9 itself filed 18 Feb. 2003.

FIELD OF THE INVENTION

The invention relates to a measurement method for fuel elements, especially a measurement method with the aid of which the burnout of the fuel elements in a pebble-bed high-temperature reactor can be determined.

BACKGROUND OF THE INVENTION

In the operation of a pebble-bed HTR with multiple passes (like AVR or THTR), a certain proportion of the recirculated fuel elements (FE) must be removed from circulation to provide room for the addition of fresh fuel elements. It is thus naturally in the interest of good fissionable material economy to remove the fuel elements which have burned out to the greatest extent where possible. For this purpose each individual circulated fuel element is subjected to a measurement. What is measured is a physical parameter which constitutes a measurement of the degree of burn-out. It is important in such a system, in the interest of good measurement precision, not necessarily that there be a proportionality between this parameter and the degree of burn-out, but rather a greater measurement effectiveness and good reproducibility of the parameter which is measured. Based upon the measured parameter, a determination is made as to whether the fuel element is to be fed back to the reactor core and optionally to which zone of the reactor core it is to be fed, or whether it is to be removed.

Within the reactor core a fission process is carried out as a result of which fission products are produced by the fissionable material within the fuel elements. The individual fuel elements during the circulation are located outside the reactor core in the ball or pebble removal tube so that further fission processes are suppressed. The fission products within the fuel elements are however radioactive and emit on their part γ radiation (gamma radiation). For different fuel elements, the measured total γ radiation emitted from a fuel element under substantially identical conditions, for example the same duration after emergence of the fuel element from the reactor core, is correlated with its burn-out.

Up to now various measuring processes have been used to determine the degree of burn-out of ball-shaped fuel elements.

With the AVR (Working Group Test Reactor), because of the relatively small circulation velocity of the fuel elements of about 500 per day, a γ spectrometric measurement of the $Cs^{137}$ present in the fuel element is possible with a liquid-nitrogen-cooled semiconductor detector. These measurements are only somewhat expensive and supply over acceptable measurement times of 20 to 40 seconds a measurement precision in the range of +2% for highly burned-out fuel elements.

With modern modular pebble-bed power reactors, like the HTR module of Siemens or the South African PBMR, the circulation speed is much higher by comparison with the AVR (about 4000 fuel elements per day) and the decay time of the fuel elements in the ball withdrawal tube is relatively short (about 2 days) so a direct translation of the measuring process from the AVR to the higher speed circulation of such reactors is not possible if only because of the short measuring time which is available. A shorter measurement time invariably gives rise to greater measurement error. Of greater significance is the fact that because of the very short decay time of the fuel elements, evaluation of the $Cs^{137}$ line can be very imprecise. The high activity of the short-lived fission products is particularly detrimental as far as the γ measurement of the $Cs^{137}$ is concerned since the evaluation of the typical 662 keV of the $Cs^{137}$ is significantly influenced by the neighboring lines. Among these are the very strong 658 keV line of $Nb^{97}$ (effective half life=16.8 hours), the weaker 661 keV line of $Ba^{140}$ (half life 12.8 days) and the strong 668 keV line of the $I^{132}$ (effective half life 76.3 hours). A corresponding correction of the measured $Cs^{137}$ signal as a rule would require very expensive measurement technology to carry out. The fast circulation in combination with a short ball discharge tube and thus a short residence time in the ball discharge tube can thus give rise to a significant influence on the reproducibility of the Cs measurement. Concrete tests of an actual reactor are not however available as yet. Those skilled in the art have treated the attainable precision very differently. Generally however it has been believed that with highly burned-out fuel elements, it is not possible to do better than a mean measurement error of +10%.

In corresponding expert circles, alternatives have been proposed for the simple measurement of total γ activity of fuel elements for modern modular pebble-bed power reactors.

The γ activity of an irradiated fuel element is dominated in the reactor core and even after its emergence from the core in the case of a not too great decay time by the short-lived fission products. The contribution of the longer-life fission product to the intensity of the radiation is practically negligible. Fuel elements which have been burned out to a lesser extent have, in the reactor core and thus also shortly before their emergence from the core, a greater power production or power productivity than more burned-out fuel elements and thus also a higher (short lived) γ activity. The measurement effect in terms of the difference in γ radiation between a fuel element which has been burned out to a lesser extent and a fuel element which is highly burned out or burned out to a greater extent is very high. (In the case of the AVR with its comparatively long decay time of the fuel elements of an average of say one month, the γ activity of the fuel elements burned out to a lesser extent is always about 3 to 4 times higher than the γ activity of the highly burned-out fuel elements. These methods are indeed not very accurate although they are very easily carried out and unusually fast (measurement time about 1 second).

As state of the art, today the combination of measurements of the total γ activity and of the $Cs^{137}$ radiation can be recognized. All of the fuel elements are thus subjected to a simple γ measurement (for example 1 second). Only with fuel elements which have been recognized as highly burned-out fuel elements is the γ activity value undertaken below the above-given limits as a parallel $Cs^{137}$ measurement (about 10 seconds). Only after the evaluation of the $Cs^{137}$ measurement is a determination made as to whether the fuel element is recirculated or withdrawn.

However, even with this combination method which permits the longer measurement duration for the Cs measurement as a rule, large mean errors have to be reckoned with which fuel elements which are burned out to a high extent. The experts in the field have indicated that the precision attainable is from +4% to +20%.

OBJECTS OF THE INVENTION

The object of the invention is to provide a measurement method for ball-shaped fuel elements which with a shorter decay time of the fuel element and in a brief measurement time or duration during the circulating operation of a pebble-bed reactor can determine the degree of burn-out of a field element.

It is another object of the invention further to provide a corresponding device for carrying out the above-mentioned measurement method.

SUMMARY OF THE INVENTION

The objects of the invention are achieved by a method for determining the degree of burnout of a ball-shaped fuel element wherein a fuel element is removed from the reactor and transferred to a measuring position, and then the fuel element is subjected to a neutron flux 2. A detector then determines a relative magnitude for the high energy $\gamma$ radiation above 1 MeV as emitted from the fuel element.

The invention is thus not a measurement process for determining the absolute value of the burnout (for example in % FIMA=Fission per initial metal atom) of a ball-shaped fuel element. The invention is also not provided to determine the burnout for fuel elements which have only a low degree of burnout. For these fuel elements, it is possible to determine the burnout based upon their significantly higher $\gamma$ activity by a simple $\gamma$ measurement.

The new and inventive method is especially provided to determine the degree of burnout for such fuel elements which have a higher degree of burnout than that which can be determined by a simple $\gamma$ measurement, especially in conjunction with the possible removal thereof as will be more specifically defined below.

The subject of the invention therefore is a method of measuring the degree of burnout of a ball-shaped fuel element which is similar to the aforedescribed process which has been determined as the combination method. The fuel elements gated out of the reactor core are subjected to a brief sample $\gamma$ measurement. Based upon a previously established first limiting value or threshold of the $\gamma$ activity, the fuel elements which are subjected to measurement are subdivided into lower burnout or higher burnout fuel elements. The fuel elements which are recognized as having a higher degree of burnout are subjected to a further measurement. This second measurement is based upon the presumption that in a fuel element which is excited or activated with thermal neutrons more fission events occur as the degree of burnout is less, i.e. the greater the number of fission events, the smaller the degree of burn out. During a fission process, hard $\gamma$ radiation is spontaneously emitted. The intensity of the hard $\gamma$ radiation, especially above 2 MeV, can thus form a measurement of the degree of burnout of the fuel element.

The measurement method is carried out as follows: The fuel element balls are gated out of the reactor core, for example in the course of circulation, and transferred to a measurement position. There they are subjected to a thermal neutron flux which gives rise to nuclear fission within the fuel element. Apart from the $\gamma$ activity of the fission product already present, this leads to the emission of the so-called spontaneous radiation which results from the nuclear fission and is in addition to that $\gamma$ activity and in the form of a hard $\gamma$ radiation. On average this hard $\gamma$ radiation is more energy rich, i.e. of a higher energy, than the $\gamma$ radiation of the fission products.

In a first measurement step, the total $\gamma$ activity of the fuel element is measured with a first defector. This measurement is carried out typically very quickly (about 1 second) which however is not very precise. This measurement serves only as a first estimation of the degree of burnout of the fuel element investigated. For a given reactor, the probability that a fuel element will have a certain overall $\gamma$ activity complies with a statistical probability distribution. This is dependent, among other things, upon the point in time at which the fuel element is measured after discharge from the reactor core. Fuel elements with a high degree of burnout have only few fission products so that the activity of the $\gamma$ radiation emitted by these products is small. If one has a fixed upper limit for the $\gamma$ radiation at which, upon a $\gamma$ radiation measurement above this limit, the fuel element will be returned to the reactor core, one can make a preselection of fuel elements for which a further measurement may be anticipated. The threshold can be determined based upon the probability distribution. For example the threshold can be selected at the point at which a maximum of 20% of all of the measured fuel elements have their measured activity lying below the threshold. Only for these 20% will the second measurement be anticipated and this second measurement can advantageously be carried out in parallel with the first. The second measurement step of the method according to the invention resides in the provision of an appropriate second detector which enables only a hard $\gamma$ radiation of a fuel element to be detected. The method according to the invention thus utilizes advantageously the reactor which is present and from which the fuel elements are removed as the neutron source to produce in the fuel element, nuclear fission. The detector suitable for this purpose must especially be capable of detecting the energy-rich radiation which preferably lies above 2 MeV. For this energy selective measurement, the energy revolution of a NaI scintillation counter is for example sufficient. The second detector should operate with a $\gamma$ total pulse rate of greater than $10^7$/second, especially greater than $10^8$/s %, Because of the short decay time of the fission products within the fuel elements, the $\gamma$ activity of the fission products dominates the $\gamma$ activity of the fission clearly. Many solutions can be used individually or in combination since the useful signals of the hard $\gamma$ radiation is not nearly as significant as the greater activity of the not so energy-rich $\gamma$ activity of the fission products of the fuel element on which it is superimposed.

1. It is advantageous to use a detector for the second measurement step which operates at a very high pulse rate, that is which has a very good time resolution and thus in a brief measurement interval will only show minor errors.

2. Further, the ratio of energy-rich (hard) radiation to the not so rich $\gamma$ radiation, favors the hard radiation if between the detector and fuel element a shield is provided which operates effectively with a high pass energy filter and thus weakens the lower energetic $\gamma$ radiation impinging on the second detector. Such a shield can be formed, for example, by a lead filter.

3. Since the second measurement is carried out with especially high precision, the second detector can advantageously be so arranged that its optimum working range lies at radiation values which are exactly those which are emitted by the fuel elements of interest, namely, those which are more highly burned out. This means that the radiation values for the lower degree of burnout fuel elements are significantly higher than the optimal working range of the second detector. To prevent possible damage to the second detector, however, several steps can be taken. Especially additional appropriate shielding can be provided so that during the measurement of fuel elements of a lesser degree of burnout, the second detector will not be overloaded. Alternatively, however, the second detector can be deactivated during measurements of fuel elements with a lesser degree of burnout, something which can be done especially simply in the case of successive measurements 1 and 2.

4. The number of induced nuclear fissions within the fuel element increases with increasing neutron flux (measurement flux). For producing the highest possible thermal neutron flux at the measurement position of the fuel element, it is suitable especially to use the reactor core itself (from which the fuel element derives) as a neutron source. In principle, however, also other neutron sources are suitable.

5. The measurement position is advantageously surrounded by water. In this manner the reactivity of the subcritical measurement arrangement is increased and fission-liberated neutrons utilize as much as possible for the further fission events. The fuel elements subjected to measurement themselves, with their fissionable material, influence the reactivity of the arrangement. This results in an amplification of the measurement effect.

6. To increase the precision of the second measurement, alternatively a plurality of the second detectors can also be provided and can have parallel counts which can be added.

7. Further, a plurality of fuel elements can be measured at several measurement positions simultaneously and in parallel. So as not to change the recycling rate of the circulation, in this manner a greater measurement duration is made available for each measurement with as a rule a positive effect on the precision of the measurements.

8. Basically one can also increase the time between the discharge of a fuel element from the reactor core and its measurement (intermediate duration) advantageously, since the γ radiation of the fission products decreases with time in accordance with their decays although the γ radiation from the induced fission remains unaffected thereby. This however requires disadvantageously expensive structural changes or unsatisfactory reactor operations.

The method of the invention allows in a simple manner a highly precise indication (error rates of only about 1 to 2%) as to the degree of burnout of a fuel element to be obtained. This method is especially suitable for distinguishing whether a fuel element circulated in a high-temperature reactor (HTR) should be gated out or returned to the reactor core. The method supports this determination advantageously as follows:

a) a fuel element is removed from the reactor and transferred to a measurement position, b) the fuel element is subjected to a thermal neutron flux, c) a first detector detects the γ radiation emitted from the fuel element, d) upon the measurement exceeding a predetermined first threshold value, the fuel element is directly recycled again to the reactor and upon the measurement falling below the limiting value or threshold, the fuel element is processed by the steps e to f, e) a second detector determines the high energy γ radiation above 1 MeV emitted from the fuel element, f) upon exceeding a predetermined second threshold or limiting value by the measurement, the fuel element is recycled to the reactor and upon the measured value lying below this threshold, the fuel element is gated out of the fuel element circulation.

BRIEF DESCRIPTION OF THE DRAWING

In the following the subject matter of the invention will be described in greater detail in connection with an embodiment and a FIGURE without the subject matter of the invention being limited thereto.

The FIGURE shows in horizontal section an embodiment of a device for carrying out the method of the invention. In that FIGURE the reference characters have the following significance:

Figure 1:
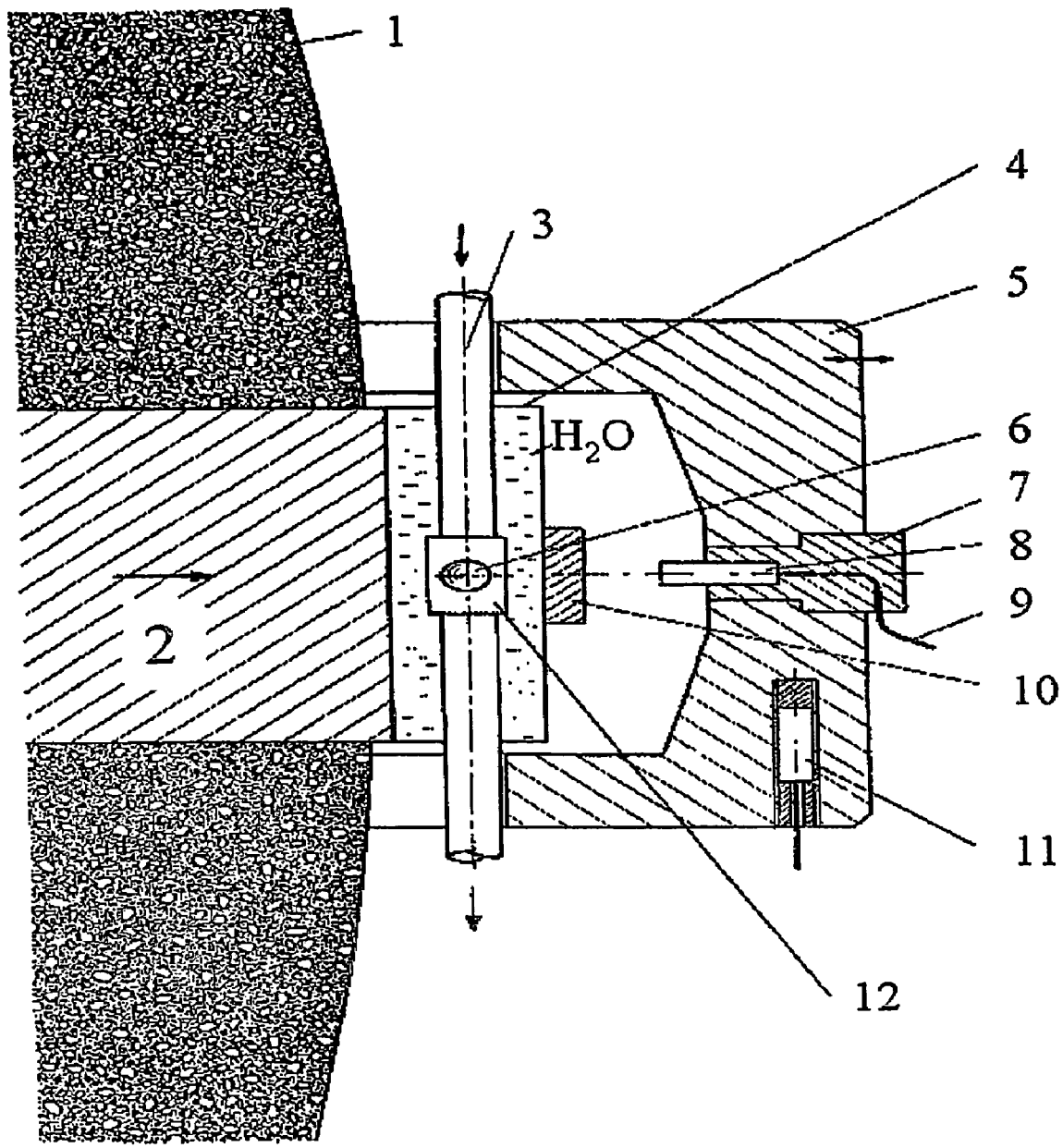

1 Reactor, outer side of the biological shield
2 Thermal column (graphite) with thermal neutron flux
3 Ball tube
4 Water tank
5 Biological shield
6 Fuel element in measurement position
7 Plug for detector replacement
8 Energy selective second γ detector with higher time resolution
9 Connecting cable to pulse processing
10 Detector shielding and energy filter, for example of lead
11 First γ detector
12 Circulating apparatus (shown schematically) with fixing of a fuel element in the measurement position The method of the invention is then carried out as follows in the device:

The fuel element 6 to be measured which has been gated out of the reactor core, is brought into a defined measurement position 12 in which it is subjected to a thermal neutron flux 2. Depending upon the degree of burnout or the fissionable material still contained in the fuel element 6, nuclear fission events occur in the interior of the fuel element with an intensity which is determined by measurement. The measured value thus represents the hard, high-energy γ radiation which is produced from the fission products thermally after the fission events and is emitted by the fuel element (spontaneous radiation). The measurement uses the fact that the energy of this hard γ radiation on energy is higher than the γ radiation emitted or by the fission products previously present in the fuel element. As a consequence, the harder energy-rich γ radiation is detected by an energy selective γ measuring device. A suitable detection system is for example a high-resolution scintillation counter 8 with high time resolution whose energy resolution is sufficient for the purpose.

The smaller portion of the higher energy γ activity from the fission products in the fuel element which fall in the range of the hard γ radiation to be measured can be measured therewith without a significant effect on the measurement precision since the total γ radiation of the fuel element to be measured is also dependent upon the degree of burnout and, indeed, in the same way. The higher the burnout the less the fission product content and thus the fission effect on the measurement and the smaller the level of the hard γ radiation and the smaller also the total fuel element activity (as to the possibility of a simple measurement of the total γ radiation of a fuel element as an effective measurement process, reference is made to the foregoing discussion on the point).

The two features which have been described, therefore, characterize the principle of the new method. The main difficulty is that because of the only short decay time of the FE (typically 2 days) the γ activity is very high (noise signal) and compared to it the hard γ radiation as a useful signal is completely in the background. If in spite of this the above-described precision is to be achieved, that is that in a short measurement interval a sufficiently large number of useful pulses are to be accumulated, the following further features of the method take on great importance.

The γ measurement device 8 (second detector) is used which can operate with a very high pulse rate and this has very good time resolution. The shielding 10 between the measurement device 8 and the fuel element 6 to be measured is so configured that the measurement device in the case of a fuel element burned out to a greater extent, that is a fuel element which is comparatively weakly emitting radiation already operates in the region of its maximum possible count rate. Highly radiating fuel elements which have been insufficiently burned out can no longer be detected with this second detector. These however in the sense of the already described combination method will be recognized with the aid of the simple γ measurement using the first detector 11.

The requisite shielding 10 between the fuel element 6 and the measuring device 8 (second detector) is made from lead so as to have the greatest possible energy filtration effect (preferably allowing only the hard γ radiation to pass).

The consumption of fissionable material for the measurement is completely negligible as a result of the short measurement duration even with very high neutron flux (measurement flux). In the interest of good measurement precision, the method can operate with the highest possible measurement flux. For that no external neutron source is applied but rather the reactor core itself is advantageously used as the neutron supplier. For that purpose the reactor contains, like with research reactors such as, for example, the Dido reactor of Forschungszentrum Julich GmbH, a "thermal column" 2 that is a throughgoing graphite connection between the side reflector and the outer side of the biological shield extending radially and interrupting the reactor vessel, if possible, at the level of the center of the reactor core. Directly ahead of the outer end surface of the graphite, the measurement position 12 is located. This measurement position 12 is in addition advantageously surrounded by water. As a result the reactivity of the subcritical measuring device is increased and the fission-liberated neutrons are used to the greatest extent possible for further fission events. The fuel elements to be measured themselves influence with their fission-material content the reactivity of the device. This leads to an amplification of the measurement effect.

In a practical embodiment the measurement position 12 is effectively provided in a part of the ball-charging apparatus 3 in which the balls can be retained without additional means. For this purpose, a ball-feeding deflector or switch s provided which can control the target with respect to the measured ball, i.e. whether the ball is returned or fed to the pebble bed or the ball is discharged. The arrangement of the feed deflector at the level of the reactor core middle (ahead of the "thermal column") affords the advantage that the long path of the ball from the region of the lower end of the ball withdrawal tube to its upper point of direction reversal of the feed tube or feed tubes to the pebble bed is subdivided into two partial stretches and thus the individual pneumatic ball conveyor path can operate with less gas displacement pressure and volume.

The entire measuring arrangement is also provided with a biological shield 5 which surrounds the measuring arrangement and a further γ detector 11. This detector is so arranged that it operates at a higher count rate when a fuel element with a smaller degree of burnout (for example after one pass through the core) is found in the measuring position 12. With this detector 11, all of the fuel elements gated into the measurement position (and thus the balls) are measured in the sense of the above-described combination method with respect to their γ activities. If the measurement results of this detector level exceeds a certain predetermined limiting value or threshold, a measured fuel element is not yet sufficiently burned out and is recycled without waiting for the second measurement to the reactor core. If the measurement by the detector 11 lies below the limiting value or threshold, the fuel element is subjected to a measurement also by the detector 8 and a determination is then made with respect to the ball target, namely the withdrawal or recycle. This choice is made again by comparison of the measurement result with a further limiting value or threshold. When the measurement lies beneath the limiting or threshold, the fuel element is withdrawn.

The two limiting values can be determined from the probability distribution of the measurement results of a large number of previously measured fuel elements, for example 300. This number is equal to the area beneath the distribution curve. For the limiting value or threshold determination, such values are selected on the measurement value scale which divide the area under the curve into certain predetermined count ratios. If for example 20% of all measured fuel elements also are intended to be measured with the second detector, the distribution curve area will break up the measurement results from the first detector 11 in a ratio of 2:8. In that case 20% of all of the measurement results will lie below the first threshold or limiting value.

If it is assumed further that the reactor is operated in a 1:10 mode, that is that for each freshly fed fuel element, 10 are recycled and also on a long-term basis that for every 10 recirculated fuel elements, one fuel element must be removed, the proportion removed must equal 10% so that in the probability distribution, the measurement result of the second detector 8 should provide a value which will divide the area under the distribution curve into two equal halves. The fuel elements whose measurement results thus fall below the second threshold or limiting value are to be removed. The removal proportion is then 10% which corresponds to the 1:10 operating mode. The probability distribution and thus also the limiting value and threshold calculation can reflect the realities of the fuel element measurements. When there is a change in the reactor power, the measurement results before processing are multiplied by the ratio between the newer and earlier powers.

Should the second detector 10 in its switched-on state be subjected to supersaturation with γ radiation to the point that it might be damaged, then advantageously both measurements would not be carried out in parallel and initially only the γ radiation measured by the first detector 11. Only when the measurement results lie below the first threshold or limiting value would the operating voltage for example of the second detector 8 be turned on. It can be noted further that the measurement need not be carried out as shown in the drawing ahead of the biological shield 1. It can also be carried out in a pocket formed in the biological shield. As a result, the thermal column is shortened and the measurement flux 2 is greater. It is also possible to carry out the measurement directly at the outer side of the reactor pressure vessel. The second detector is then naturally located outside the γ radiation of the reactor core to a more significant extent. Since the higher measurement flux 2 is so significant however for the precision of the method that in this case a constant measurement of the γ background must be taken into consideration as long as it is not dominant.

The invention claimed is:

1. A method of measuring a relative magnitude of the burnout of a fuel element in a reactor, the method comprising the steps of sequentially:

a) transferring a fuel element from the reactor to a measuring position,
b) subjecting the transferred fuel element at the position to a neutron flux,
c) measuring with a first detector the total γ radiation emitted by the transferred fuel element; and thereafter
d) if the radiation measured by the first detector exceeds a predetermined first limit, returning the transferred fuel element back to the reactor and
e) if the radiation measured by the first detector does not exceed the first limit, measuring with a second detector a magnitude of high energy γ radiation above 1 MeV emitted by the transferred fuel element; and thereafter
f) only if the radiation measured by the second detector exceeds a predetermined second limit, returning the transferred fuel element back to the reactor, the transferred fuel element not being returned to the reactor if the radiation measured by the second detector is below the second limit.

2. The method according to claim 1 wherein the second detector determines a relative magnitude for the high energy γ radiation above 2 MeV emitted by the transferred fuel element.

3. The method according to claim 1 wherein the second detector operates with a count rate of at least $10^7$/s.

4. The method according to claim 1 wherein a scintillation counter is used as the second detector.

5. The method according to claim 1, further comprising a shield between the measurement position and the second detector.

6. The method according to claim 5 wherein the shield is a lead filter.

7. The method according to claim 1 in which the first detector detects the γ radiation of the fuel element in less than 2 seconds.

8. The method according to claim 1 in which the second detector detects the high energy γ radiation of the fuel element in less than 30 seconds.

9. The method according to claim 1, further comprising the step of
surrounding the fuel element in the measurement position with water.

10. The method according to claim 1 wherein the first limit is so selected that a proportion of the fuel elements which are required for operating the reactor falls below this first limit.

11. The method according to claim 1 wherein the first limit is so selected that with a 1:10 mode of operating the reactor a maximum of 20% of the fuel elements lies below this first limit.

12. The method according to claim 1 wherein the second limit is so established that a proportion of all fuel elements which are measured but are required for operating the reactor falls below this second limit.

13. The method according to claim 11 in which the second limit is so established that in a 1:10 mode a maximum of 15% of all measured fuel elements lie below this second limiting.

14. A device for measuring a relative magnitude of the burnout of a fuel element in a reactor, the device comprising:
means for transferring a fuel element from the reactor to a measuring position,
means including a neutron source for subjecting the transferred fuel element to a neutron flux,
means including a first detector for measuring the total γ radiation emitted by the transferred fuel element and for comparing the radiation measured by the first detector with a predetermined first limit;
means for, if the radiation measured by the first detector exceeds a predetermined first limit, returning the transferred fuel element back to the reactor;
means for, if the radiation measured by the first detector does not exceed the first limit, measuring with a second detector a magnitude for high energy γ radiation above 1 MeV emitted by the transferred fuel element and comparing the radiation measured by the second detector with a predetermined second limit; and
means for, only if the radiation measured by the second detector exceeds the predetermined second limit, returning the transferred fuel element back to the reactor, the transferred fuel element not being returned to the reactor if the radiation measured by the second detector is below the second limit.

15. The device according to claim 14, further comprising a shield between the measurement position and the second detector.

16. The device according to claim 15 wherein the shield is a lead filter.

17. The device according to claim 14, wherein a scintillation counter is the second detector.

18. The device according to claim 14 wherein the second detector has a counting rate of at least $10^7$/s.

19. The device according to claim 14 wherein the measurement position is at least partly surrounded by water.

* * * * *